United States Patent [19]
Spatafora et al.

[11] Patent Number: 5,694,745
[45] Date of Patent: Dec. 9, 1997

[54] PRODUCT WRAPPING METHOD AND MACHINE

[75] Inventors: Mario Spatafora, Bologna; Loris Grepioni, Castel Maggiore, both of Italy

[73] Assignee: Azionaria Costruzioni Macchine Automatiche A.C.M.A. S.p.A., Bologna, Italy

[21] Appl. No.: 612,505

[22] Filed: Mar. 7, 1996

[30] Foreign Application Priority Data

Mar. 10, 1995 [IT] Italy ................. B095A0092
Mar. 10, 1995 [IT] Italy ................. B095A0093

[51] Int. Cl.[6] ................. B65B 9/06; B65B 7/06; B65B 51/26; B65B 51/32
[52] U.S. Cl. ................. 53/450; 53/547; 53/550; 53/374.3
[58] Field of Search ................. 53/450, 550, 549, 53/370, 373.7, 374.3, 481

[56] References Cited

U.S. PATENT DOCUMENTS

| | | | |
|---|---|---|---|
| 2,113,078 | 4/1938 | Campbell | 53/547 X |
| 3,342,015 | 9/1967 | Kawasaki et al. | 53/370 X |
| 3,968,627 | 7/1976 | Seragnoli | 53/370 |
| 4,429,513 | 2/1984 | Beckers et al. | 53/547 |
| 4,862,673 | 9/1989 | Francioni | 53/550 X |
| 5,092,102 | 3/1992 | James et al. | 53/550 X |
| 5,197,262 | 3/1993 | Katz et al. | 53/550 |
| 5,481,849 | 1/1996 | Spatafora | 53/370 |

Primary Examiner—Horace M. Culver
Attorney, Agent, or Firm—Oblon, Spivak, McClelland, Maier & Neustadt, P.C.

[57] ABSTRACT

A product wrapping method and machine whereby a continuous tubular wrapping, formed gradually about an orderly succession of equally spaced products with a first given spacing, is fed through an operating station and divided into segments, each enclosing a respective product; and the segments and respective products, rotated 90° about an axis crosswise to a transfer plane, are transferred with a second given spacing along a substantially straight path to an output conveyor by a transfer device, which grips each product and the respective segment before the product leaves the operating station.

31 Claims, 5 Drawing Sheets

PRODUCT WRAPPING METHOD AND MACHINE

BACKGROUND OF THE INVENTION

The present invention relates to a product wrapping method.

The present invention is particularly suitable for use in the food packing industry, to which the following description refers purely by way of example.

In the food packing industry, so-called "flow pack" machines are used whereby an orderly succession of equally spaced products is fed along a given path, along which a tubular wrapping is gradually formed about the products. Once formed, the tubular wrapping is fed, together with the products, through an operating station where it is cut into segments to form a succession of tubular wrappings of the same length as the spacing of the products, and which are normally sealed to define a succession of pillow pack wrappings, each enclosing a respective product.

Downstream from the operating station, the products are normally rotated 90° by feeding them along two side by side conveyors traveling at different speeds, or by causing them to cooperate successively with a fixed obstacle located a given distance from the path along which the centers of the products travel. Since the products, as they are rotated 90°, are in no way controlled as to position or orientation, the succession of rotated products may not be equally spaced and in time with those upstream from the operating station.

SUMMARY OF THE INVENTION

It is an object of the present invention to provide a product wrapping method designed to overcome the aforementioned drawbacks.

According to the present invention, there is provided a product wrapping method comprising the steps of feeding products at a given rate, along a first path extending in a first given plane and in a given traveling direction, and with a first orientation parallel to said direction, to an operating station, together with a tubular wrapping enclosing at least one said product upstream from the operating station; feeding each product and the tubular wrapping through the operating station to cut the tubular wrapping into segments, each enclosing a respective product; feeding each product and the relative segment along a second path extending in a second transfer plane substantially parallel to the first plane; and imparting to each product a second orientation rotated substantially 90° in relation to the first orientation, as the product travels along the second path; the opposite ends of each segment being closed to form a respective wrapping; characterized in that the products and respective segments are fed along said second path by means of at least one gripping device movable at said rate along said second path; the gripping device effecting said 90° rotation about an axis perpendicular to said second plane and crosswise to said traveling direction; each product being engaged by said gripping device downstream from the operating station and before the relative segment is detached from the tubular wrapping.

The present invention also relates to a product wrapping machine.

According to the present invention, there is provided a product wrapping machine comprising an operating station; conveying means for feeding the products to the operating station at a given rate and with a given spacing, along a first path extending in a first plane of the products, and in a given traveling direction with a first orientation parallel to the traveling direction, together with a tubular wrapping extending in the traveling direction and enclosing at least one product upstream from the operating station; detaching means located at the operating station and for cutting the tubular wrapping into segments of substantially the same length as said spacing; a transfer device for feeding each product and the relative segment from the operating station and along a second path extending in a second transfer plane substantially parallel to the first plane, and for imparting to each product a second orientation rotated substantially 90° in relation to the first orientation; and means for closing the ends of said segments to form respective said wrappings; characterized in that the transfer device comprises at least one gripping device movable along the second path at said rate and in time with said conveying means, to grip said products at a gripping location along the second path and at a distance of less than said spacing from the operating station; said second orientation being rotated 90° in relation to the first orientation and about an axis perpendicular to said second plane and crosswise to said traveling direction.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
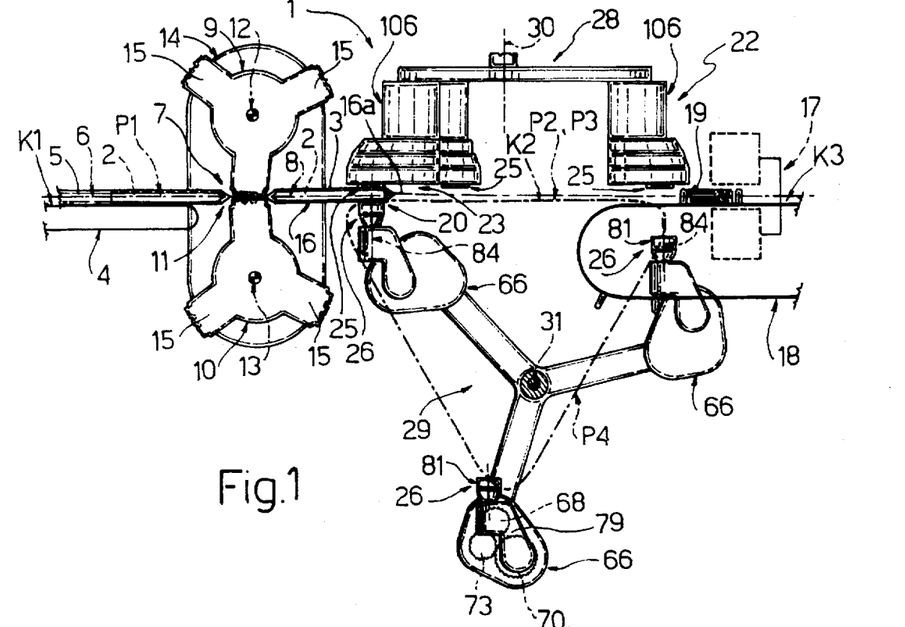
FIG. 1 shows a schematic side view, with parts removed for clarity, of a first preferred embodiment of the wrapping machine according to the present invention.

Number 1 in FIG. 1 indicates a so-called "flow pack" wrapping machine for enclosing products 2 inside respective so-called "pillow pack" wrappings 3.

Machine 1 comprises a known conveying device 4 in turn comprising in known manner (not shown) a known sealing device (not shown) for receiving a continuous strip (not shown) of normally transparent plastic material; folding the strip transversely; sealing the opposite longitudinal edges of the strip to form a continuous tubular wrapping 5; and feeding wrapping 5 axially at constant speed, along a path P1 extending in a plane K1 of wrapping 5, and in a traveling direction 6 to an operating Station 7. Conveying device 4 also comprises in known manner a known conveyor (not shown) located upstream from the sealing device, and which supplies the sealing device, in direction 6 and at said constant speed, with a succession of products 2 equally spaced with a given spacing in plane K1 and along path P1, and with their longitudinal axes 8 parallel to direction 6, so that said continuous strip (not shown) is gradually folded transversely and then sealed longitudinally about products 2, which are housed, equally spaced, inside and along tubular wrapping 5, and are fed by wrapping 5 to station 7 at said speed and in direction 6.

Station 7 comprises a pair of substantially similar rollers 9 and 10 substantially tangent to each other at a point 11 defining the output end of path P1, and which present respective axes of rotation 12 and 13 crosswise to direction 6. Rollers 9 and 10 are located respectively over and beneath path P1 and plane K1, and are connected to an actuating assembly 14 so as to rotate respectively anticlockwise and clockwise (in FIG. 1) about respective axes 12 and 13 at a surface speed of the same value and sign as the traveling speed of wrapping 5 at the point of tangency 11 of rollers 9 and 10. Each roller 9, 10 comprises three known peripheral heads 15 equally spaced about relative axis 12, 13 with the same spacing as products 2 along path P1, and each of which travels through the point of tangency 11 in time with a corresponding head 15 on the other roller 10, 9 to engage wrapping 5 between each pair of adjacent products 2.

Figure 2:
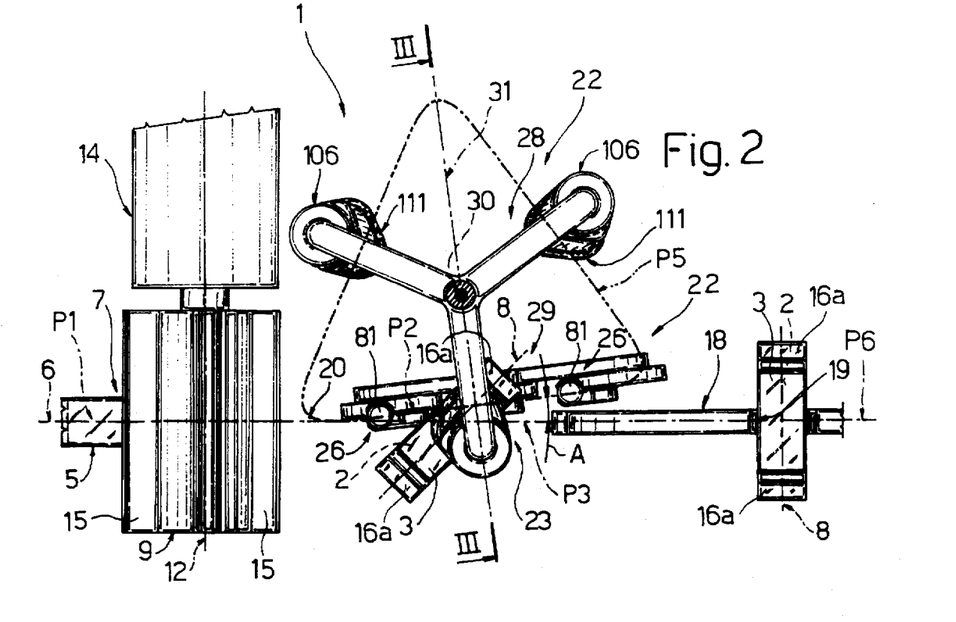
FIG. 2 shows a plan view of the FIG. 1 machine.

In the example shown in FIGS. 1 and 2, heads 15 are known cutting and sealing heads, each corresponding pair of which engages wrapping 5 as described above to cut it into segments 16 of a length equal to said spacing and each enclosing a respective product 2, and to simultaneously seal the end of each segment 16 to form a respective wrapping 3.

According to the variation shown in FIG. 9 and described in detail later on, heads 15 are cutting heads only, and the ends 16a of segments 16 are sealed later by a sealing unit 17 shown by the dotted line in FIG. 1 and located downstream from station 7 in direction 6.

Machine 1 also comprises a pocket conveyor 18 located at the output of machine 1 and aligned with conveying device 4, and which receives products 2, each housed inside a respective wrapping 3, inside respective pockets 19, and feeds products 2 in equally spaced manner and at constant speed in direction 6, with the ends 16a of respective wrappings 3 coplanar with each other and parallel to direction 6.

With reference to FIGS. 1 and 2, machine 1 also comprises a transfer device 22 located downstream from station 7 in an adjustable position parallel to direction 6, and presenting three gripping members 23, each of which provides for gripping a product 2 at a gripping location 20 located an adjustable distance from station 7, but at a distance that is always less than the dimension of each product 2 measured parallel to respective axis 8.

On machine 1, each product 2, together with respective segment 16, is therefore gripped by device 22 prior to leaving station 7, i.e. before the respective segment 16 is detached from continuous tubular wrapping 5.

Device 22 provides for transferring products successively from location 20 to a respective pocket 19 of conveyor 18 along a transfer plane K2 substantially parallel to plane K1, and for rotating each product 90° about an orienting axis crosswise to plane K2 and perpendicular to respective axis 8, by moving each gripping member 23 along a substantially straight path P2 along plane K2. In particular, path P2 is coplanar with path P1 and inclined in relation to path P1 by given angle A which, as explained in more detail later on, is such that, as product 2 is transferred from location 20 to respective pocket 19, the center of each product 2 travels along a straight path P3 aligned with path P1.

Each gripping member 23 is defined by a pair of jaws 25, 26 fitted to respective carousel conveyors 28, 29 located the first over the second on either side of the plane defined by paths P2 and P3, and rotating respectively about a vertical axis 30 to the side of path P3, and about an axis 31 perpendicular to axis 30 and to path P3.

Figure 3:
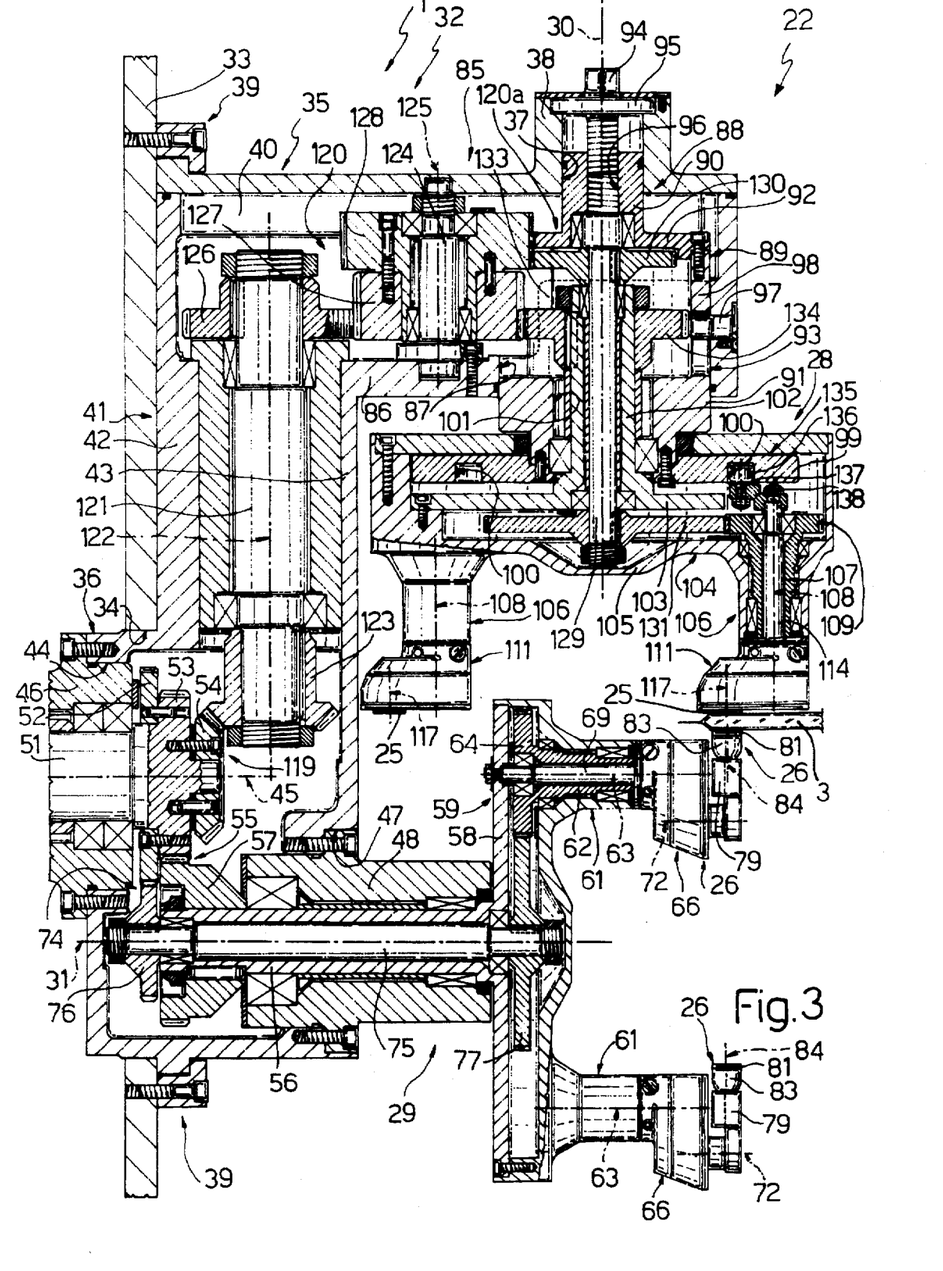
FIG. 3 shows a larger-scale section, with parts removed for clarity, along line III—III in FIG. 2.

With reference to FIG. 3, device 22 comprises a fixed frame 32 in turn comprising a vertical wall 33 parallel to path P1 and presenting a hole 34. Frame 32 also comprises a box body 35 substantially in the form of an upside down L, an appendix 36 of which engages hole 34, and which, at the top, presents a hole 37 coaxial with axis 30, and a tubular body 38 extending upwards from the periphery of hole 37 and coaxial with axis 30. Body 35 is fitted to wall 33, in an adjustable position parallel to direction 6, by a guide-slide connection 39, and is defined laterally by two sides 40, only one of which is shown in FIG. 3.

Body 35 presents a substantially vertical first arm 41 which, in addition to vertical portions of sides 40, also comprises two facing lateral end walls 42 and 43 parallel to wall 33. More specifically, wall 42 extends in contact with wall 33, and is fitted integral with appendix 36, which presents an eccentric hole 44 with an axis 45 parallel to axis 31 and engaged by a sleeve 46 fitted integral with wall 42. Wall 43 presents a hole 47 coaxial with axis 31 and engaged by a sleeve 48 fitted integral with wall 43.

Device 22 is driven by a drive shaft 51 mounted for rotation through sleeve 46 and fitted with two cylindrical gears 52, 53 and a bevel gear 54, all coaxial with axis 45. Gear 53 forms the input of a transmission 55 for driving carousel conveyor 29, and which comprises a hollow shaft 56 coaxial with axis 31 and mounted for rotation inside sleeve 48. Shaft 56 is driven by gear 53 via an end gear 57, and, at the opposite end to that fitted with gear 57, presents an end flange 58 supporting conveyor 29 and axially closing a hollow, substantially circular body 59, the convex end 60 of which presents three substantially cylindrical, peripheral tubular appendixes 61 equally spaced about axis 31. Each appendix 61 houses in rotary manner a respective hollow shaft 62 presenting a respective axis 63 parallel to axis 31, and external teeth 64 on the end facing flange 58.

Figures 4, 5, 6, 7:
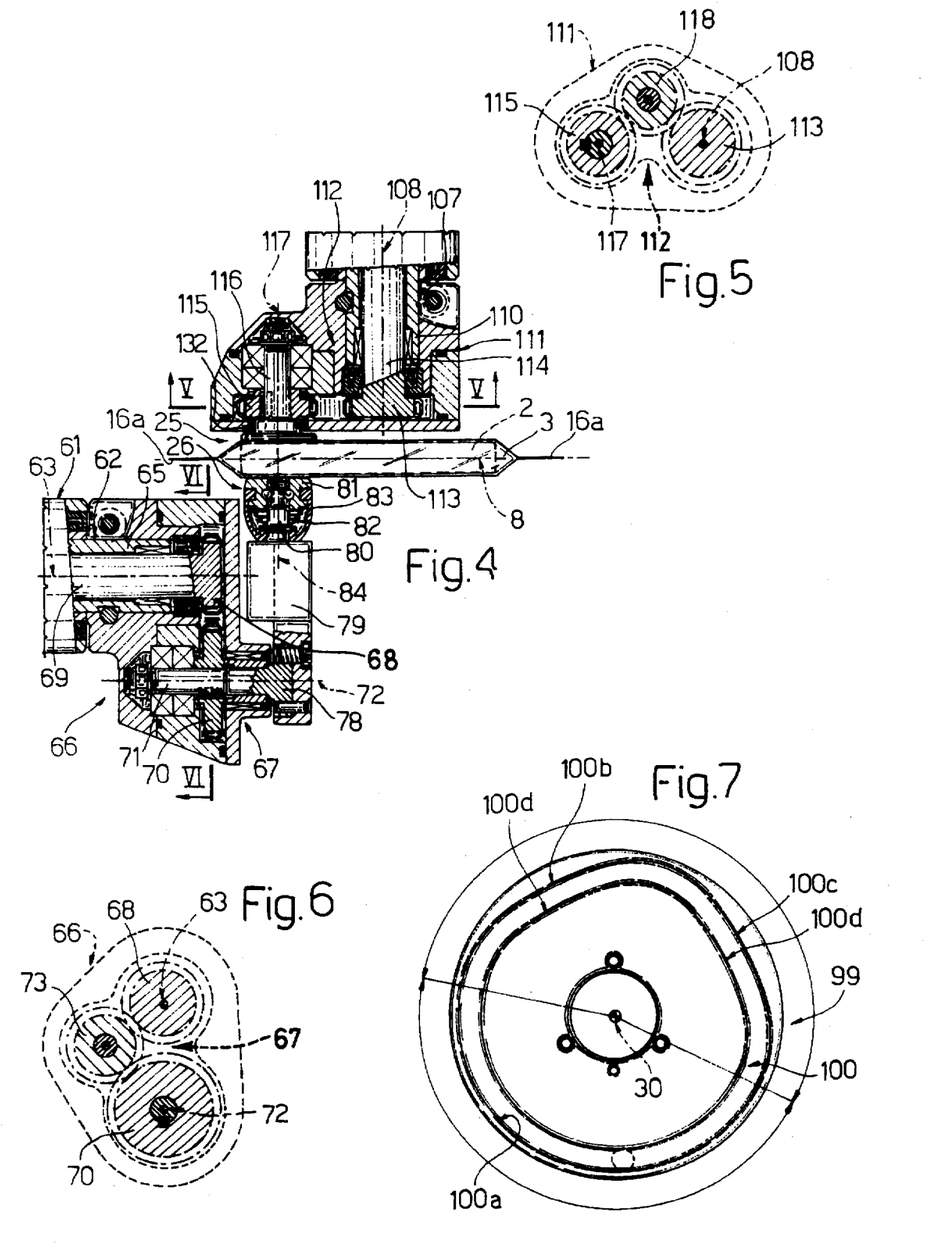
FIG. 4 shows a larger-scale view of a detail in FIG. 3.
FIG. 5 shows a section along line V—V in FIG. 4.
FIG. 6 shows a section along line VI—VI in FIG. 4.
FIG. 7 shows a larger-scale plan view of a detail in FIG. 3.

With reference to FIGS. 3 and 4, each shaft 62 presents an end portion 65 projecting beyond the free end of respective appendix 61 and fitted with a shoe 66 forming the carrier of an epicyclic transmission 67, which comprises a sun gear 68 formed on the end of a shaft 69 which is coaxial with axis 63, is integral with flange 58 so as to be angularly fixed in relation to respective appendix 61, and engages hollow shaft 62 in rotary manner. Transmission 67 also comprises a planetary gear 70 fitted to a shaft 71 supported for rotation by shoe 66 and presenting an axis 72 parallel to axis 63; and an idle gear 73 located inside shoe 66 together with and for connecting sun gear 68 and planetary gear 70.

Transmission 67 is driven by gear 52 via a parallel-axis transmission 74 comprising a shaft 75 mounted for rotation inside shaft 56 and coaxially with axis 31, and fitted at opposite ends with a gear 76 meshing with gear 52, and a gear 77 meshing with teeth 64.

As shown in FIG. 4, shaft 71 comprises an end portion 78 projecting outwards from shoe 66 and fitted with a substantially radial arm 79, from the free end of which there projects axially a pin 80 supporting a respective jaw 26. Jaw 26 comprises an annular plate 81 movable axially along pin 80 towards arm 79 and in opposition to a spring 82 protected by a rubber sleeve 83, the opposite ends of which are secured respectively to plate 81 and pin 80.

The input-output gear ratios of transmission 55 and the transmission defined by transmissions 67 and 74 are so calculated that, as conveyor 29 moves jaws 26 about axis 31, each arm 79 travels parallel to itself, with the axis 84 of respective pin 80 maintained upwards and perpendicular to the plane defined by paths P2 and P3, and each shoe 66 rotates about respective axis 63 so as to move respective jaw 26, in known manner, along a path P4 extending in a vertical plane perpendicular to that of paths P2, P3, and substantially in the form of an equilateral triangle with rounded vertices, one side of which extends from location 20 to conveyor 18 along path P2.

Body 35 also comprises a tubular second arm 85 defined laterally by a portion of sides 40, and which projects parallel to axis 31 from wall 33, and extends over and is shifted laterally in relation to sleeve 48 as described in more detail later on.

Arm 85 is closed at the bottom by a substantially horizontal bottom wall 86 presenting a hole 87 coaxial with hole 37 and defined by a cylindrical surface for guiding a device 88 for adjusting the axial position of conveyor 28. Device 88 comprises a laterally-open hollow central cylindrical body 89 mounted so as to slide along axis 30 through hole 87; and two appendixes 90 and 91 coaxial with axis 30 and respectively extending upwards from a top wall 92 of body 89, and downwards from a bottom portion 93 of body 89. Device 88 also comprises a screw 94 mounted for rotation through a plate 95 closing tubular body 38, and connected to a threaded axial hole 96 formed in appendix 90; and an antirotation key 97 connected in axially-sliding manner to a lateral wall 98 of body 89, and fitted to arm 85.

The bottom end of appendix 91 is connected to a circular plate coaxial with axis 30 and defining a face cam 99, the downward-facing surface of which presents an annular groove 100 in turn presenting a circular idle portion 100a of roughly 160° with its center at axis 30, and two substantially specular active portions 100b and 100c. Each portion 100b, 100c presents a central portion 100d of negligible curvature, and which is connected to the other portions 100a and 100c (100b) by respective substantially circular connecting portions.

Cam 99 and tubular appendix 91 present a cylindrical through hole 101 coaxial with axis 30 and engaged in rotary and axially-fixed manner by a hollow shaft 102 coaxial with axis 30. Like hollow shaft 56, shaft 102 presents an end flange 103 fitted integral with a hollow body 104, the convex end 105 of which, substantially similar to end 60, presents three substantially cylindrical, peripheral tubular appendixes 106 equally spaced about axis 30. Each appendix 106 houses in rotary manner a respective hollow shaft 107 presenting a respective axis 108 parallel to axis 30, and external teeth 109 on the end facing flange 103.

With reference to FIGS. 3 and 4, each shaft 107 presents an end portion 110 projecting beyond the free end of respective appendix 106 and fitted with a shoe 111 forming the carrier of an epicyclic transmission 112, which comprises a sun gear 113 formed on the end of a shaft 114 coaxial with axis 108 and engaging hollow shaft 107 in rotary manner. Transmission 112 also comprises a planetary gear 115 fitted to a shaft 116 supported for rotation by shoe 111 and presenting an axis 117 parallel to axis 108 and substantially coincident with said orienting axis of product 2 between jaws 25, 26; and an idle gear 118 located inside shoe 111 together with and for connecting sun gear 113 and planetary gear 115.

Transmission 112 is driven by gear 54 via a perpendicular-axis transmission 119 and two parallel-axis transmissions 120 and 120a. Transmission 119 comprises a shaft 121 fitted inside arm 41 so as to rotate about an axis 122 parallel to axis 30; and a bevel gear 123 fitted to the bottom end portion of shaft 121. Transmission 120 comprises a shaft 124 fitted inside arm 85 and presenting an axis 125 parallel to axis 30; a gear 126 fitted to the top end of shaft 121; and two gears 127, 128 integral with each other, fitted in rotary manner to shaft 124, and the first of which meshes with gear 126. Transmission 120a comprises a shaft 129 mounted for rotation inside shaft 102 and coaxial with axis 30; and two gears 130, 131 fitted to the opposite ends of shaft 129 and respectively meshing with gear 128 and teeth 109.

As shown in FIG. 4, shaft 116 comprises an end portion 132 projecting outwards from shoe 111 and fitted integral with a plate forming jaw 25.

Gear 127 forms the input of a transmission 133 for driving conveyor 28, and which comprises shaft 102, flange 103, and a gear 134 fitted to the top end of shaft 102 and connected to gear 127.

The input-output gear ratios of transmissions 119, 120, 133 and the transmission defined by transmissions 119, 120, 120a, 112 are so calculated that, as conveyor 28 moves jaws 25 about axis 30, each jaw 25 moves in a horizontal plane substantially tangent to the upward face of products 2, and each shoe 111 rotates about respective axis 108 in such a manner as to move respective jaw 25 in known manner along a horizontal path P5 substantially in the form of an equilateral triangle with rounded vertices and distinct from path P4. More specifically, axis 30 is shifted laterally in relation to the vertical plane defined by path P4, so that one side of path P5 extends from location 20 to conveyor 18 along path P2, and is parallel to and faces a corresponding side of path P4 at the intersection of the planes defined by paths P4 and P5.

The above gear ratios are also such that, as it is moved about axis 30 by the rotation of conveyor 28, each jaw 25 would travel without rotating, if it were not for a regulating device 135 connected to transmission 112, and which, in addition to cam 99, also comprises a tappet roller 136 rolling inside groove 100 and mounted for rotation on a pin 137 fitted to a lever 138 in turn fitted to the end of each shaft 114. Groove 100 is so shaped that each roller 136, as it travels along portion 100b, rotates respective shaft 116 and hence respective jaw 25 anticlockwise (in FIG. 2) by 90° about respective axis 117 as jaw 25 travels along path P2. Similarly, as it travels along portion 100c of groove 100, each roller 136 rotates respective shaft 116 and hence respective jaw 25 clockwise (in FIG. 2) by 90° about respective axis 117 as jaw 25 travels along the rest of path P5.

Figure 8A:
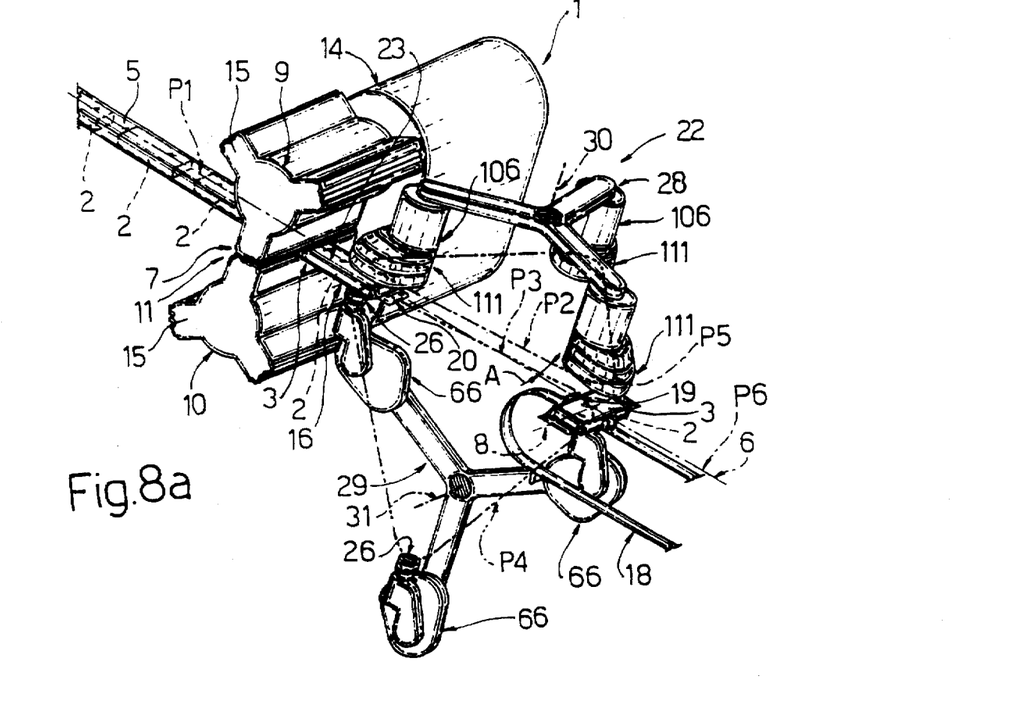
FIG. 8 shows the FIG. 1 machine in two different operating positions.
Figure 8B:
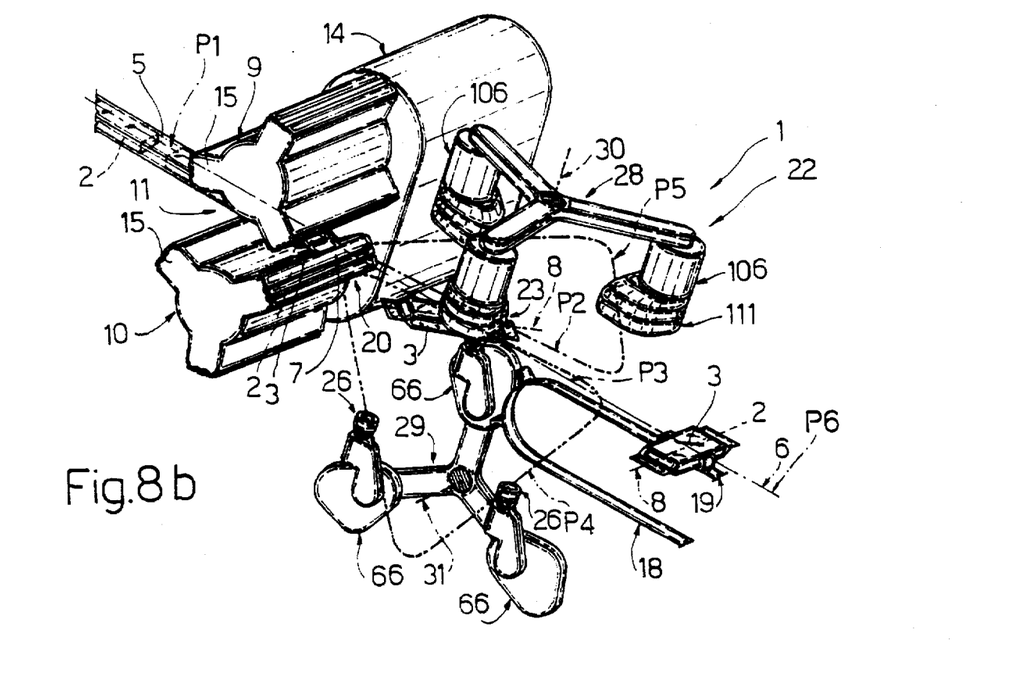

In actual use, and with reference to FIGS. 1, 2 and 8, conveyors 28 and 29 of transfer device 22 rotate in time with each other and respectively anticlockwise about axis 30 and clockwise about axis 31, so that a jaw 25 and respective jaw 26 forming a respective gripping member 23 are positioned facing each other at location 20, and proceed, still facing and substantially stationary in relation to each other, along path P2 to the input of conveyor 18 and in time with a pocket 19. By means of adjusting device 88, the position of jaws 25 in relation to that of respective jaws 26 may be so adjusted that, along path P2, the distance between each jaw 25 and respective jaw 26 is approximately equal to but no more than the thickness of product 2, and the respective wrapping 3 is rotated about the respective said orienting axis, while maintaining it substantially over and coplanar with plane K2.

In addition to operating in time with each other and with conveyor 18, conveyors 28 and 29 also operate in time with station 7 and with products 2 traveling along conveyor 4 to station 7. More specifically, since the distance between location 20 and station 7 is, as stated, less then the length of product 2, since jaws 25 and 26 travel respectively in a horizontal and a vertical plane up to location 20, and then proceed together along path P2, and since conveyors 28, 29 and the products 2 traveling along conveyor 4 are so timed that a gripping member 23 and a product 2 are always fed simultaneously to location 20, each gripping member 23 compresses spring 82 to grip a respective product 2 at location 20, before product 2 leaves the region between rollers 9 and 10, and before the rear end of respective segment 16 has been defined by cutting tubular wrapping 5.

This provides for maintaining the timing of products 2 as they travel through station 7 and until they reach respective pockets 19 on conveyor 18.

As stated, each jaw 25 is rotated anticlockwise (in FIGS. 2 and 8) by 90° as it is transferred along path P2 from location 20 to the input of conveyor 18. Since, during transfer and normal operation, product 2 is gripped between jaws 25 and 26 of each gripping member 23, and since jaw 26 is mounted idly about axis 84, the rotation of jaw 25 about its axis 117 also provides for rotating product 2 and jaw 26.

As shown in FIGS. 2 and 8, an end portion of each product 2 is gripped by respective gripping member 23 at location 20, so that the center of product 2 is located a given distance from axis 84 of respective jaw 26, and, when jaw 25 is rotated by regulating device 135, travels crosswise to path P2 of respective gripping member 23. Consequently, to keep the center of product 2 on path P3 aligned with path P1 and with conveyor 18, the angle of inclination A of path P2 in relation to path P3 must conform with the equation:

$$d = 1 \tan A$$

where "d" is the distance between the center of product 2 and the gripping point of respective member 23, and "1" is the length of path P3.

Figure 9:
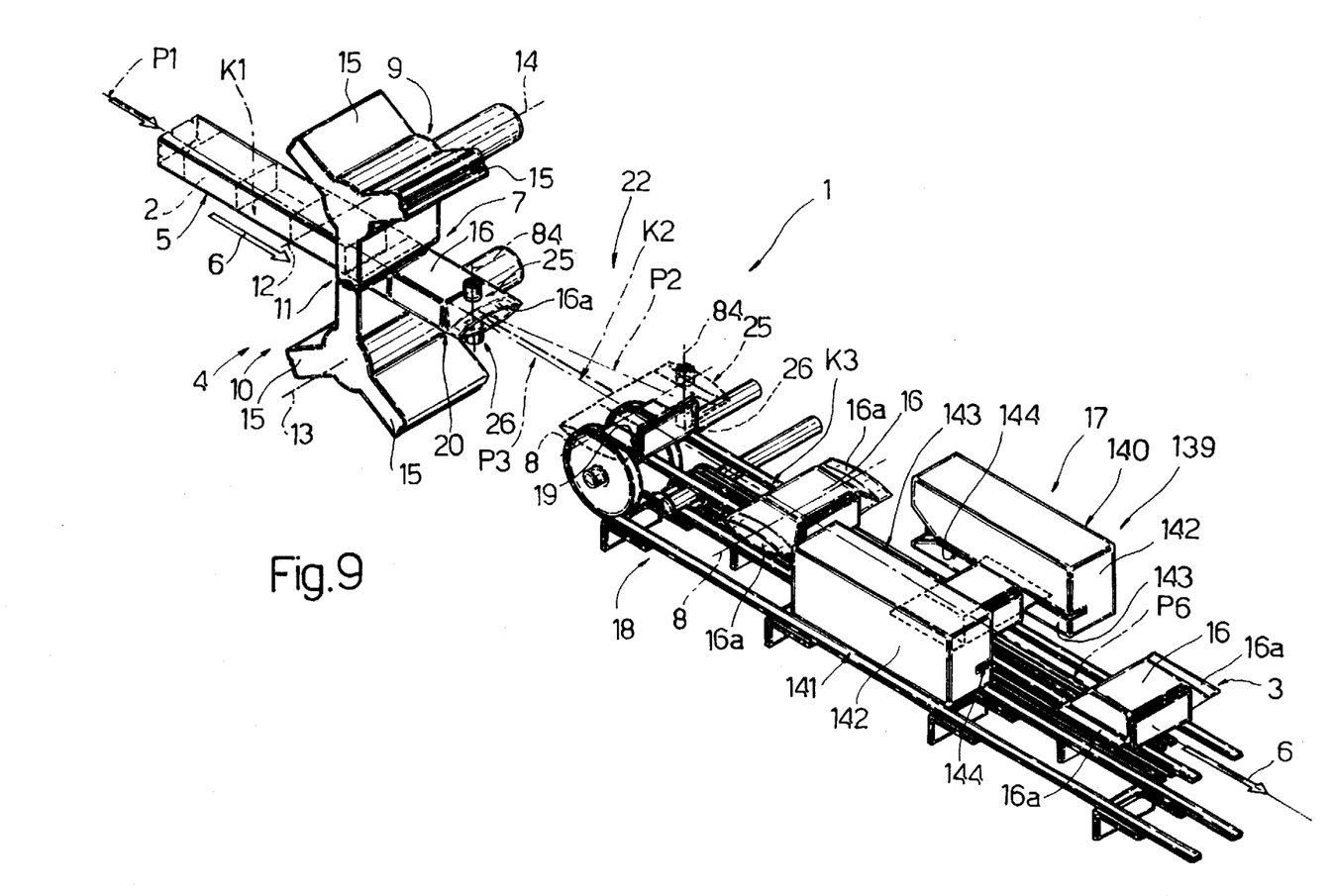
FIG. 9 shows a schematic view in perspective, with parts removed for clarity, of a second preferred embodiment of the FIG. 1 machine.

As stated, in the event heads 15 are simply cutting heads, ends 16a of wrappings 3 are closed along conveyor 18 by means of sealing unit 17, which, as shown more clearly in FIG. 9, is located at a sealing station 139 downstream from transfer device 22, along conveyor 18 and along a path P6 extending parallel to path P1 and direction 6 along conveyor 18, and provides for closing ends 16a of each segment 16 to form a respective "pillow pack" wrapping 3.

Unit 17 comprises two known sealing devices 140, 141 facing each other in fixed positions on either side of conveyor 18 at station 139, and each of which comprises a box body 142 presenting a respective lateral surface 143 facing path P6 and separated from the other surface 143 by a distance greater than the length of product 2 and less than the length of respective segment 16. Each surface 143 is positioned crosswise to the axes 8 of products 2, and presents a respective opening 144 located, together with the other opening 144, parallel to direction 6 and in a plane coplanar with the product plane K3 defined by the transportation branch of conveyor 18, and substantially parallel to plane K2.

Openings 144 are engaged in sliding manner by ends 16a of each segment 16 as this travels along path P6, to close ends 16a in known manner. More specifically, each opening 144 presents respective known heating and pressing elements (not shown) for heating and sealing ends 16a.

We claim:

1. A product wrapping method comprising the steps of feeding products (2) at a given rate, along a first path (P1) extending in a first given plane (K1) and in a given traveling direction (6), and with a first orientation parallel to said direction (6), to an operating station (7), together with a tubular wrapping (5) enclosing at least one said product (2) upstream from the operating station (7); feeding each product (2) and the tubular wrapping (5) through the operating station (7) to cut the tubular wrapping (5) into segments (16), each enclosing a respective product (2); feeding each product (2) and each respective segment (16) along a second path (P2) extending in a second transfer plane (K2) substantially parallel to the first plane (K1); and imparting to each product (2) a second orientation rotated substantially 90° in relation to the first orientation, as the product (2) travels along the second path (P2); the opposite ends (16a) of each segment (16) being closed to form a respective wrapping (3); characterized in that the products (2) and respective segments (16) are fed along said second path (P2) by means of at least one gripping device (23) movable at said rate along said second path (P2); the gripping device (23) effecting said 90° rotation about an axis (117) perpendicular to said second plane (K2) and crosswise to said traveling direction (6); each product (2) being engaged by said gripping device (23) downstream from the operating station (7) and before each respective segment (16) is detached from the tubular wrapping (5).

2. A method as claimed in claim 1, characterized in that each said product (2) is gripped by the respective said gripping device (23) at a gripping location (20) along the second path (P2) and located at a distance from said operating station (7) smaller than the dimension of the product (2) measured parallel to said traveling direction (6).

3. A method as claimed in claim 1, characterized in that each said product (2) presents a center, and is gripped by the respective gripping device (23) at a given distance from the center and at a gripping location (20) along the second path (P2).

4. A method as claimed in claim 3, characterized in that said second path (P2) is inclined by a given angle (A) in relation to said traveling direction (6) and as of said gripping location (20); said angle (A) being such as to permit the center of each product (2) to travel along a third path (P3) aligned with the first path (P1) as each product (2) and the respective segment (16) are fed along the second path (P2).

5. A method as claimed in claim 2, characterized in that said gripping device (23) comprises a first and second jaw (25, 26) which are moved along respective distinct, substantially flat, annular paths (P5, P4) presenting a substantially common portion, at least part of which defines said second path (P2).

6. A method as claimed in claim 5, characterized in that said annular paths (P5, P4) lie in two planes substantially perpendicular to each other; said second path (P2) extending substantially along the intersection of said two planes.

7. A method as claimed in claim 6, characterized in that one of said planes is substantially horizontal.

8. A method as claimed in claim 6, characterized in that said two annular paths (P5, P4) are substantially triangular paths; said common portion extending substantially along a given side of each said triangular path; each said given side extending through said gripping location (20); and each said jaw (25) (26) being fed along the respective said given side, in time with and facing the other jaw (26) (25), and in such a manner as to be stationary in relation to the other jaw (26) (25) along said second path (P2).

9. A method as claimed in claim 5 characterized in that said 90° rotation of each product (2) is effected by rotating at least one of said jaws (25, 26) by 90°.

10. A method as claimed in claim 9, characterized in that said 90° rotation of each product (2) is effected by rotating a first (25) of said jaws (25, 26) by 90°; the other jaw (26) being mounted idly about its axis (84) and being rotated by the first jaw (25) via the product (2) interposed between the two jaws (25, 26).

11. A method as claimed in claim 1, characterized in that it comprises the further step of transferring each said product (2), via said gripping device (23), to an output conveyor (18), the input of which is located at the output end of said second path (P2).

12. A method as claimed in claim 11, characterized in that the output conveyor (18) is aligned with said first path (P1).

13. A method as claimed in claim 11, characterized in that the ends (16a) of each segment (16) are closed by closing means (17) located in a fixed position along said output conveyor (18).

14. A method as claimed in claim 13, characterized in that said closing means (17) are sealing means for sealing the ends (16a) of each segment (16).

15. A method as claimed in claim 12, characterized in that said ends (16a) of each segment (16) are closed by said closing means (17) by feeding the segment (16) in said direction (6) and through said closing means (17) with said ends (16a) parallel to said direction (6) and coplanar with each other and with a third plane (K3) substantially parallel to the second plane (K2).

16. A machine for wrapping products (2) in wrappings (3), the machine comprising an operating station (7); conveying means (4) for feeding the products (2) to the operating station (7) at a given rate and with a given spacing, along a first path (P1) extending in a first plane (K1) of the products (2), and in a given traveling direction (6) with a first orientation parallel to the traveling direction (6), together with a tubular wrapping (5) extending in the traveling direction (6) and enclosing at least one product (2) upstream from the operating station (7); detaching means (9, 10) located at the operating station (7) and for cutting the tubular wrapping (5) into segments (16) of substantially the same length as said spacing; a transfer device (22) for feeding each product (2) and each respective segment (16) from the operating station (7) and along a second path (P2) extending in a second transfer plane (K2) substantially parallel to the first plane (K1), and for imparting to each product (2) a second orientation rotated substantially 90° in relation to the first orientation; and means (15)(17) for closing the ends of said segments (16) to form respective said wrappings (3); characterized in that the transfer device (22) comprises at least one gripping device (23) movable along the second path (P2) at said rate and in time with said conveying means (4), to grip said products (2) at a gripping location (20) along the second path (P2) and at a distance of less than said spacing from the operating station (7); said second orientation being rotated 90° in relation to the first orientation and about an axis (117) perpendicular to said second plane (K2) and crosswise to said traveling direction (6).

17. A machine as claimed in claim 16, characterized in that said gripping location (20) is located at a distance of less than said spacing from said operating station (7).

18. A machine as claimed in claim 16, characterized in that said second path (P2) is inclined by a given angle (A) in relation to said traveling direction (6) and as of said gripping location (20); said angle (A) being such as to permit the center of each product (2) to travel along a third path (P3) aligned with the first path (P1) as each product (2) and the respective segment (16) are fed along the second path (P2).

19. A machine as claimed in claim 16, characterized in that said gripping device (23) comprises a first and second jaw (25, 26); the transfer device (22) comprising first and second conveyor means (28, 29) for moving the jaws (25, 26) along respective distinct, substantially flat, annular paths (P5, P4) presenting a substantially common portion, at least part of which defines said second path (P2).

20. A machine as claimed in claim 19, characterized in that said annular paths (P5, P4) lie in two planes substantially perpendicular to each other; said second path (P2) extending substantially along the intersection of said two planes.

21. A machine as claimed in claim 20, characterized in that one of said planes is substantially horizontal.

22. A machine as claimed in claim 20, characterized in that said two annular paths (P5, P4) are substantially triangular paths; said common portion extending substantially along a given side of each said triangular path; each said given side extending through said gripping location (20); and said first and second conveyor means (28, 29) moving the respective said jaws (25, 26) along the respective said given side in time with each other, in a position (20) facing each other, and at the same speed.

23. A machine as claimed in claim 22, characterized in that each of said first and second conveyor means (28, 29) rotates about a respective first axis of rotation (30, 31), and comprises at least one support (106, 61) eccentric in relation to the respective said first axis of rotation. (30, 31); a shoe (111) (66) fitted to and rotating in relation to said support (106) (61) about a respective second axis of rotation (108) (63); and an output shaft (116) (71) fitted to said shoe (111) (66) so as to rotate about a respective third axis of rotation (117) (72); the output shaft (116) (71) being fitted with a respective said jaw (25) (26); and the third axis of rotation (117) (72) being parallel to and a given distance from said second axis of rotation (108) (63).

24. A machine as claimed in claim 23, characterized in that each of said conveyor means (28) (29) comprises, for each said support (106) (61), an epicyclic transmission (112) (67) in turn comprising a respective input shaft (129) (69) coaxial with said second axis of rotation (108) (63), and a respective said output shaft (116) (71); each epicyclic transmission (112) (67) being so formed as to maintain the respective output shaft (116) (71) stationary in relation to said first axis of rotation (30) (31) along said second path.

25. A machine as claimed in claim 24, characterized in that each said epicyclic transmission (112) (67) comprises a carrier fitted to the respective input shaft (129) (69) and defined by the respective said shoe (111) (66); transmission means (120, 120a) (74) for rotating the input shaft (129) (69) about the respective second axis of rotation (108) (63); a sun gear (113) (68) coaxial with the respective second axis of rotation (108) (63); and a planetary gear (115) (70) fitted to the respective output shaft (116) (71).

26. A machine as claimed in claim 25, characterized in that the sun gear (68) of each epicyclic transmission (67) of said second conveyor means (29) is angularly fixed in relation to the second conveyor means (29); a radial arm (79) being fitted to the respective output shaft (71); and the respective said jaw (26) being defined by a plate fitted idly to said arm (79) so as to rotate in relation to the arm (79) and about an axis (84) radial in relation to the respective third axis (72).

27. A machine as claimed in claim 25 characterized in that each jaw (25) of said first conveyor means (28) is defined by a plate coaxial with the respective output shaft (116) and rotating, together with the output shaft (116), about the respective said third axis (117).

28. A machine as claimed in claim 27, characterized in that said first conveyor means (28) comprise, for each respective said epicyclic transmission (112), an adjusting device (135) for adjusting the angular position of the respective said sun gear (113) in relation to the first conveyor means (28); said adjusting device (135) oscillating the sun gear (113) back and forth by 90° about the respective second axis (108) for each complete turn of the first conveyor means (28) about the respective first axis (30).

29. A machine as claimed in claim 16, characterized in that said closing means (15) are carried on said detaching means (9, 10).

30. A machine as claimed in claim 16 characterized in that said closing means (17) are located in a fixed position along said output conveyor (18).

31. A machine as claimed in claim 30, characterized in that said closing means (17) are sealing means for sealing the ends (16a) of each segment (16); said ends (16a) being parallel to said traveling direction (6) and coplanar with each other and with a third plane (K3) substantially parallel to the second plane (K2).

* * * * *